T. HALL.
VALVE GEAR.
APPLICATION FILED APR. 26, 1911.
1,013,549.
Patented Jan. 2, 1912.
3 SHEETS—SHEET 3.
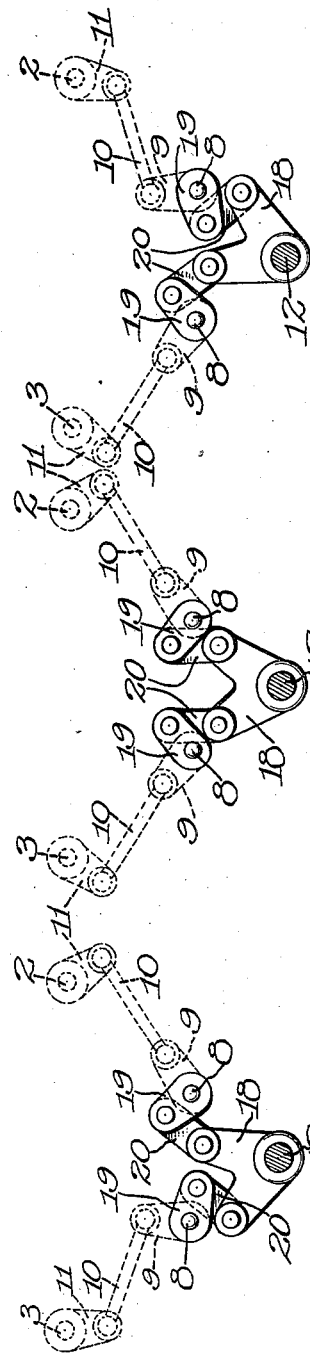
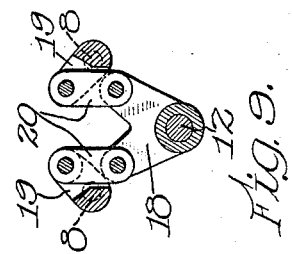
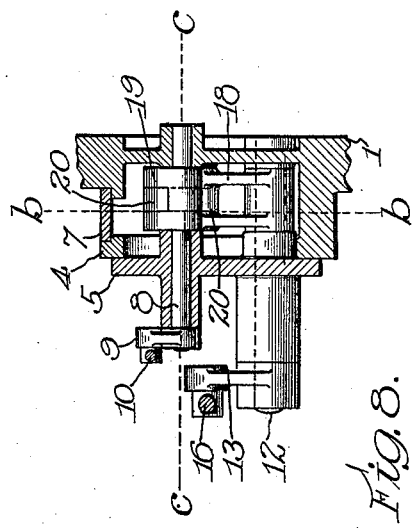
Witnesses:
Inventor:
Thomas Hall
By: James W. See
Atty.

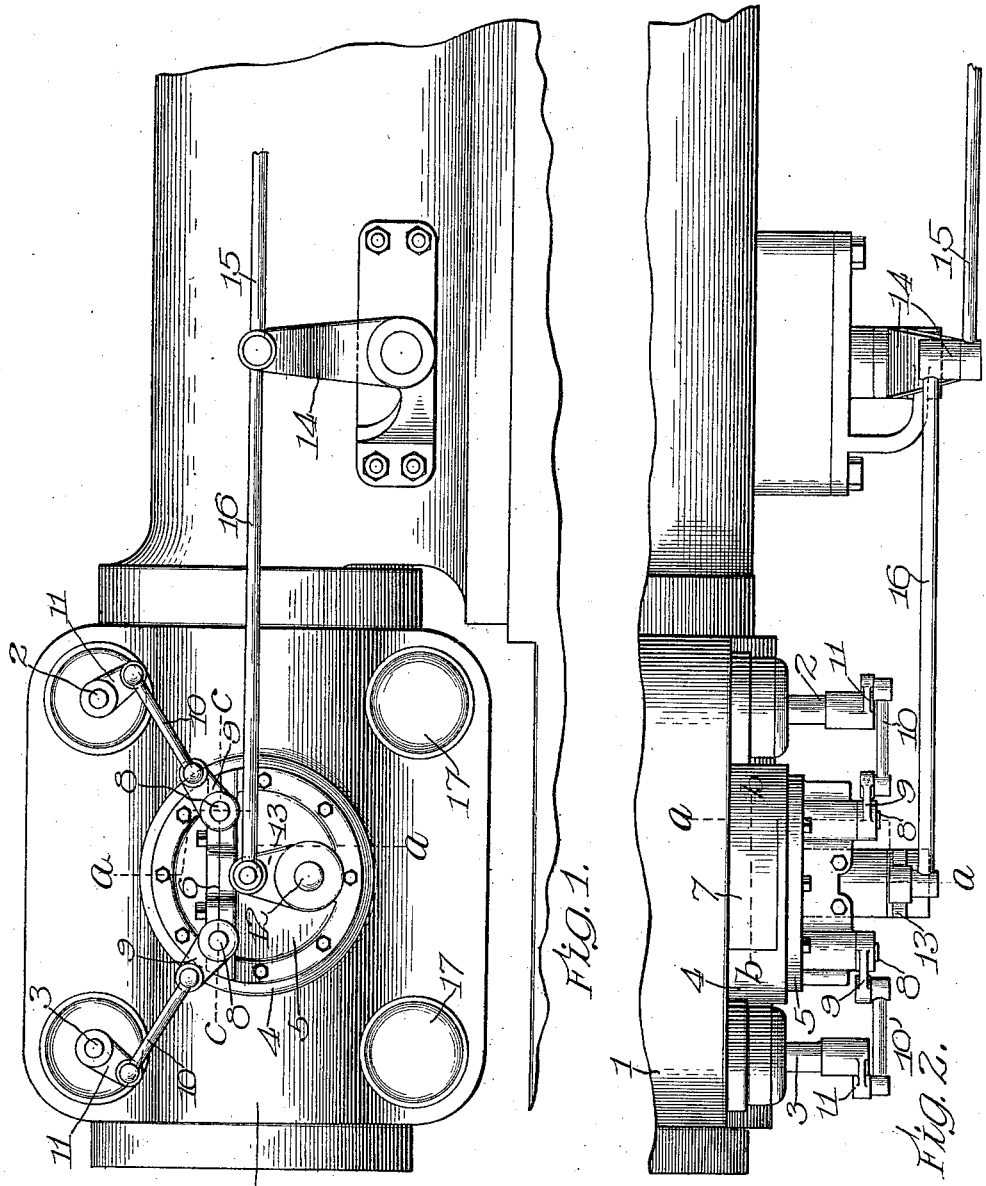

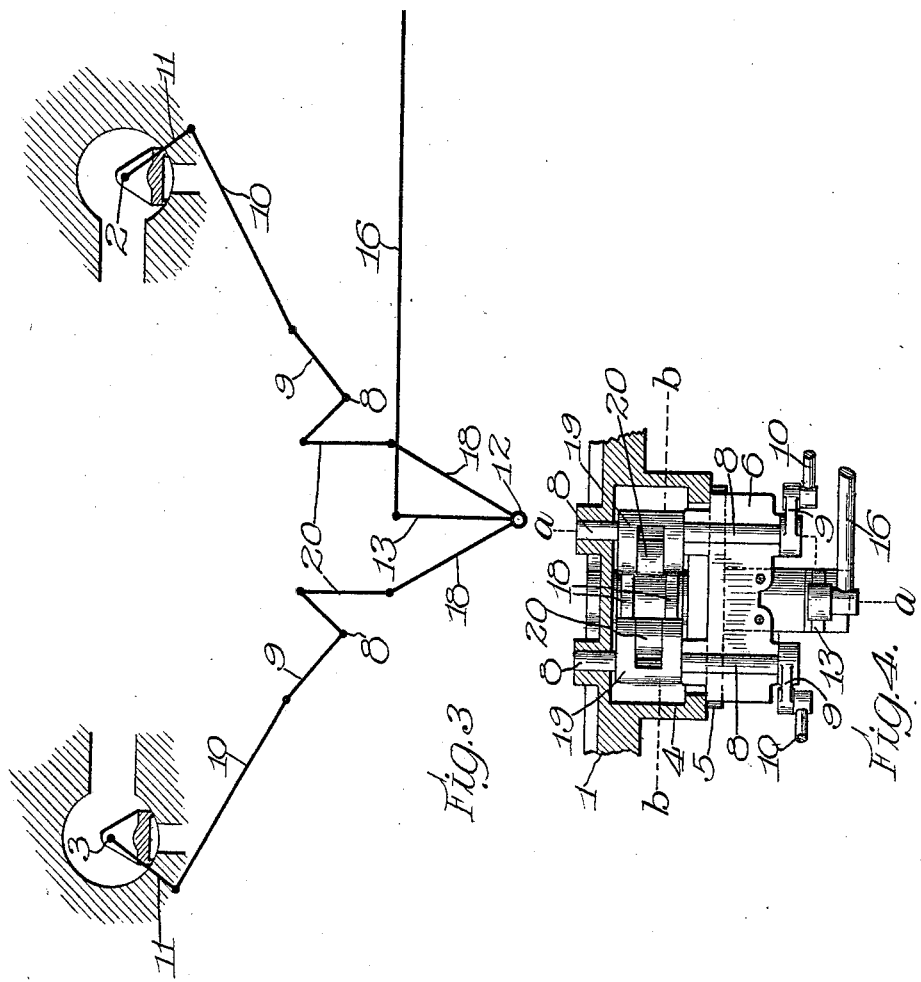

UNITED STATES PATENT OFFICE.

THOMAS HALL, OF RIDGWAY, PENNSYLVANIA, ASSIGNOR TO RIDGWAY DYNAMO & ENGINE COMPANY, OF RIDGWAY, PENNSYLVANIA.

VALVE-GEAR.

1,013,549.  Specification of Letters Patent.  Patented Jan. 2, 1912.

Application filed April 26, 1911. Serial No. 623,343.

*To all whom it may concern:*

Be it known that I, THOMAS HALL, a subject of the King of Great Britain, residing at Ridgway, Elk county, Pennsylvania, have invented certain new and useful Improvements in Valve-Gears, of which the following is a specification.

This invention relates to improvements in valve-gears for engines often spoken of as of the "four-valve" type, engines with four valves of the Corliss class and designed to have the steam-valves positively driven but in such manner as to simulate the quick opening and closing of the steam-valves of engines of the Corliss type.

Attention is directed to United States Patent No. 979002, granted December 20th, 1910, on my application, for improvements in valve-gears. In that construction a rocker-box is secured to the engine frame between the crank and the cylinder, rockers in the rocker-box being oscillated by eccentric-rods and, in turn, transmitting motion by links to the valves.

The present invention aims at the realization of the results of the patented construction but by different mechanism, and the present invention will be readily understood from the following description taken in connection with the accompanying drawings in which:—

Figure 1 is a side elevation of the cylinder end of a four-valve engine provided with valve-gear embodying the present invention. Fig. 2 a plan of the same: Fig. 3 a diagram illustrating the motion-work of the valve-gear: Fig. 4 a horizontal section of the rocker-box in the plane of line *c* of Figs. 1 and 8: Figs. 5, 6 and 7 diagrams of the rockers in various positions: Fig. 8 a vertical section of the rocker-box in the plane of line *a* of Figs. 1, 2 and 4: and Fig. 9 a vertical section of rockers in the plane of line *b* of Figs. 4 and 8.

In the drawings: 1, indicates the cylinder: 2, the stem of the steam-valve at the crank end of the cylinder: 3, the stem of the steam-valve at the head end of the cylinder: 4, a circular rocker-box projecting from the center of the side of the cylinder and open at its outer face: 5, a removable faceplate closing the outer face of the rocker-box, this faceplate carrying three bearings parallel with the valve-stems, one bearing in the lower portion and two bearings in the upper portion of the rocker-box: 6, a horizontal joint separating the face-plate into upper and lower portions, the joint passing through the two upper bearings of the face-plate: 7, a removable lid in the top of the rocker-box: 8, rock-shafts journaled in the upper bearings of the faceplate and having inner ends journaled in bearings in the rear wall of the rocker-box: 9, arms fast on the rock-shafts 8 exterior to the rocker-box: 10, links extending from these arms to the valve-arms on the steam-valve stems: 11, the arms fast on the steam-valve stems and engaged by the links 10: 12, a rocker-shaft journaled in the lower bearing of the faceplate and having its inner end journaled in a bearing in the rear wall of the rocker-box: 13, an arm fast on this lower rock-shaft, exterior to the rocker-box: 14, a rocker pivotally mounted on the engine frame between the cylinder and the crank: 15, a rod connected with rocker 14 and adapted to be actuated by an eccentric on the crank-shaft: 16, a link connecting rockers 13 and 14, rocker 14 being an expedient for shortening the eccentric-rod and lessening the weight imposed upon rocker 13: 17, the location of the exhaust-valves, with which the present invention does not concern itself: 18, a rocker fast on rock-shaft 12, within the rocker-box, this rocker having two arms of equal length: 19, a rocker fast on each of rocker-shafts 8, within the rocker-box, the rockers 19 being preferably formed integrally with their rock-shafts: and 20, links connecting each of the rockers 19 with an arm of rocker 18. Lower rocker 18 is bifurcated, as is the case also with rockers 19, and links 20 engage within these bifurcations. The faceplate makes a tight joint with the rocker-box of which it forms a part, and it is designed that the rocker-box contain a bath of oil for the lubrication of the moving parts within it, those moving parts being subject to violent strains and rapid motions. Lid 7 gives access to the interior of the rocker-box for purposes of lubrication and inspection. By unbolting the faceplate from the rocker-box all of the rocker mechanism pertaining directly to the rocker-box can be withdrawn horizontally.

By unbolting and removing the upper portion only of the faceplate the upper rockers are accessible for inspection, etc.

In the diagrams, Fig. 3 shows the rocker mechanism in mid-position, and similarly as to Fig. 6, while Figs. 5 and 7 show the mechanism in opposite extreme positions. The steam-valves, as is well understood, are at certain stages substantially balanced and at other stages unbalanced. An analysis of the diagrams will develop the fact that the valve movements are extremely rapid; that a given valve has a long dwell in closed position while the other valve is making its rapid movement; and that the dwelling of the valves takes place during their unbalanced stage so that the movements of the valves may be imparted to them under the most favorable conditions as regards balancing. The mechanism is symmetrical and accessible and very compact.

A horizontal engine has been chosen for illustration and the rocker-box is disposed below the plane of the steam-valves. Where such words as "below", "under" and "above" are employed in the claims it is to be understood that they are to be considered merely in their relative sense.

I claim:—

1. An engine valve-gear comprising, an engine cylinder, an oscillating steam-valve at each end of the cylinder, a main rockshaft mounted on the cylinder below and between the steam-valves, a rocker on the main rockshaft to serve as means whereby the main rockshaft may be oscillated, a two-armed main rocker fast on the main rockshaft, a secondary rockshaft disposed between the main rockshaft and each of the steam-valves, a secondary rocker on each secondary rockshaft, a link connecting each of the secondary rockers with an arm of the main rocker, a valve-arm connected with each steam-valve, a valve-driving arm on each secondary rockshaft, and a link connecting each valve-driving arm positively with a valve-arm, combined substantially as set forth.

2. An engine valve-gear comprising, an engine cylinder, an oscillating steam-valve at each end of the cylinder, a main rockshaft mounted on the cylinder below and between the steam-valves, a rocker on the main rockshaft to serve as means whereby the main rockshaft may be oscillated, a two-armed main rocker fast on the main rockshaft, a secondary rockshaft disposed between the main rockshaft and each of the steam-valves, a secondary rocker on each secondary rockshaft, a link connecting each of the secondary rockers with an arm of the main rocker, a valve-arm connected with each steam-valve, a valve-driving arm on each secondary rockshaft, a link connecting each valve-driving arm with a valve-arm, and a rocker-box supported by the cylinder and inclosing the main and secondary rockers and having in its walls bearings for the rockshafts, combined substantially as set forth.

3. An engine valve-gear comprising, an engine cylinder, an oscillating steam-valve at each end of the cylinder, a main rockshaft mounted on the cylinder below and between the steam-valves, a rocker on the main rockshaft to serve as means whereby the main rockshaft may be oscillated, a two-armed main rocker fast on the main rockshaft, a secondary rockshaft disposed between the main rockshaft and each of the steam-valves, a secondary rocker on each secondary rockshaft, a link connecting each of the secondary rockers with an arm of the main rocker, a valve-arm connected with each steam-valve, a valve-driving arm on each secondary rockshaft, a link connecting each valve-driving arm with a valve-arm, an open-faced rocker-box supported by the cylinder and inclosing the main and secondary rockers and having in its rear wall bearings for the rock-shafts, and a removable faceplate secured to the front of the rocker-box and having outer bearings for the rockshafts, combined substantially as set forth.

4. An engine valve-gear comprising, an engine-cylinder, an oscillating steam-valve at each end of the cylinder, a main rockshaft mounted on the cylinder below and between the steam-valves, a rocker on the main rockshaft to serve as means whereby the main rockshaft may be oscillated, a two-armed main rocker fast on the main rockshaft, a secondary rockshaft disposed between the main rockshaft and each of the steam-valves, a secondary rocker on each secondary rock-shaft, a link connecting each of the secondary rockers with an arm of the main rocker, a valve-arm connected with each steam-valve, a valve-driving arm on each secondary rockshaft, a link connecting each valve-driving arm with a valve-arm, an open-faced rocker-box supported by the cylinder and inclosing the main and secondary rockers and having in its rear wall bearings for the rock-shafts, and a removable faceplate closing the face of the rocker-box and having outer bearings for the rockshafts, the face-plate being formed in two parts separated in a plane passing through the outer bearings of the secondary rockshafts, combined substantially as set forth.

5. The combination of an engine cylinder, valve rock shafts, one near each end of said cylinder, an arm depending from each shaft, quick-acting valve-operating mechanism adjacent to the cylinder near the center thereof and equidistant from the valve rock shafts, positive link connections between said operating mechanism and each of said depending arms, a rock shaft for the movement of said valve-operating mechanism, an arm on said shaft, and a connection from said arm to a revolving part of the engine for moving the arm.

6. In valve mechanism, the combination of a circular casing secured to an engine cylinder, valve-operating mechanism therein, a removable face-plate closing one end of said casing and securing said valve mechanism in position, a removable upper section for said casing, and a removable inspection cover in said upper section.

THOMAS HALL.

Witnesses:
C. R. SLADE,
C. A. FAY.

Copies of this patent may be obtained for five cents each, by addressing the "Commissioner of Patents, Washington, D. C."